(12) United States Patent
Clevorn et al.

(10) Patent No.: US 9,148,870 B2
(45) Date of Patent: Sep. 29, 2015

(54) MOBILE COMMUNICATIONS RADIO RECEIVER FOR MULTIPLE NETWORK OPERATION

(75) Inventors: Thorsten Clevorn, Duesseldorf (DE); Herbert Dawid, Herzogenrath (DE); Bertram Gunzelmann, Koenigsbrunn (DE)

(73) Assignee: Intel Deutschland GmbH, Neubiberg (DE)

( * ) Notice: Subject to any disclaimer, the term of this patent is extended or adjusted under 35 U.S.C. 154(b) by 126 days.

(21) Appl. No.: 13/087,529

(22) Filed: Apr. 15, 2011

(65) Prior Publication Data

US 2012/0264390 A1    Oct. 18, 2012

(51) Int. Cl.
*H04M 1/00* (2006.01)
*H04W 68/00* (2009.01)
*H04W 68/12* (2009.01)

(52) U.S. Cl.
CPC .............. *H04W 68/00* (2013.01); *H04W 68/12* (2013.01)

(58) Field of Classification Search
CPC .................................................. H04W 88/06
USPC ................. 455/552.1, 313, 435.1–435.2, 455/450–452.1, 458, 553.1; 370/345–347
See application file for complete search history.

(56) References Cited

U.S. PATENT DOCUMENTS

| 7,047,025 | B2 | 5/2006 | Jung |
| 7,099,691 | B2 | 8/2006 | Saito |
| 2004/0042531 | A1 | 3/2004 | Arikan et al. |
| 2005/0101351 | A1* | 5/2005 | Lee et al. ...................... 455/558 |
| 2007/0086437 | A1* | 4/2007 | DiFazio et al. ............... 370/352 |
| 2007/0275746 | A1* | 11/2007 | Bitran .......................... 455/509 |
| 2009/0213827 | A1 | 8/2009 | Bitran et al. |
| 2009/0215472 | A1 | 8/2009 | Hsu |
| 2010/0124223 | A1* | 5/2010 | Gibbs et al. ................... 370/389 |
| 2011/0217969 | A1* | 9/2011 | Spartz et al. ............... 455/422.1 |
| 2012/0088501 | A1* | 4/2012 | Chin et al. .................... 455/433 |
| 2012/0190362 | A1* | 7/2012 | Subbarayudu et al. ..... 455/435.1 |
| 2012/0275380 | A1* | 11/2012 | Chin et al. .................... 370/328 |
| 2013/0203426 | A1* | 8/2013 | Harnay ........................ 455/450 |

FOREIGN PATENT DOCUMENTS

CN            101621865 A    1/2010

OTHER PUBLICATIONS

Office Action Dated Apr. 30, 2014 Chinese Patent Application No. 201210124350.X.

* cited by examiner

*Primary Examiner* — Edward Urban
*Assistant Examiner* — Rui Hu
(74) *Attorney, Agent, or Firm* — Eschweiler & Associates, LLC

(57) ABSTRACT

A mobile communications radio receiver for multiple radio network operation includes an RF unit configured to generate a first down-converted signal from a radio signal received from a first radio network and a second down-converted signal from a radio signal received from a second radio network. Further, the mobile communications radio receiver includes a paging indicator channel demodulator configured to demodulate during a first period of time a paging indicator channel of the first radio network based on the first down-converted signal and for demodulating during a second period of time a paging indicator channel of the second radio network based on the second down-converted signal.

18 Claims, 6 Drawing Sheets

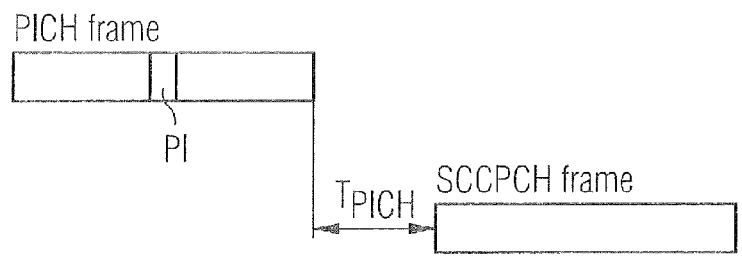
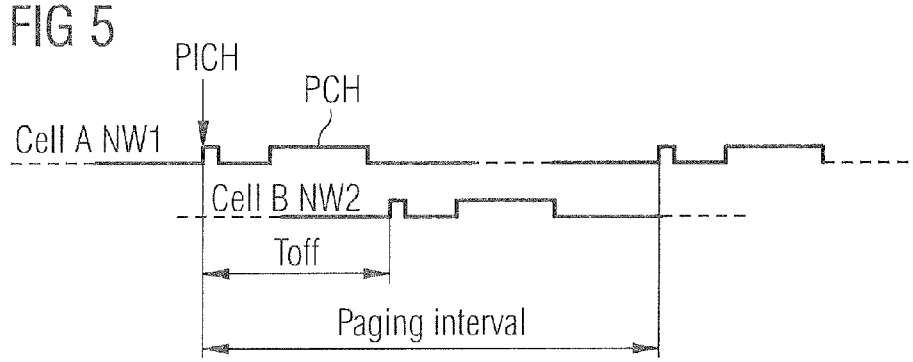
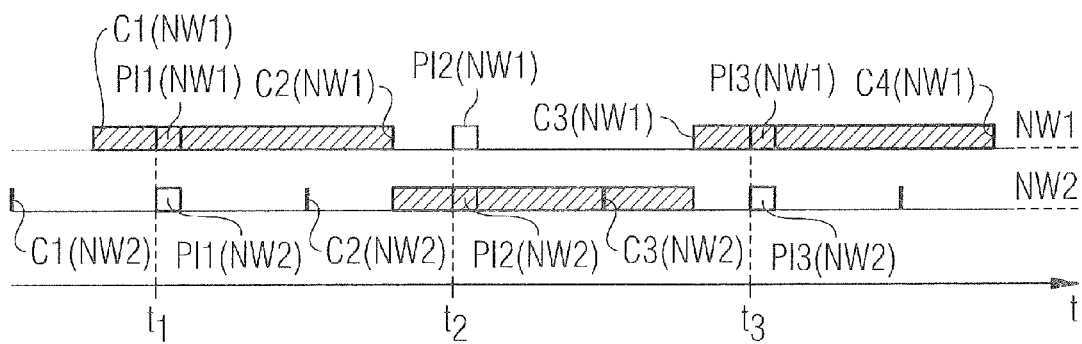

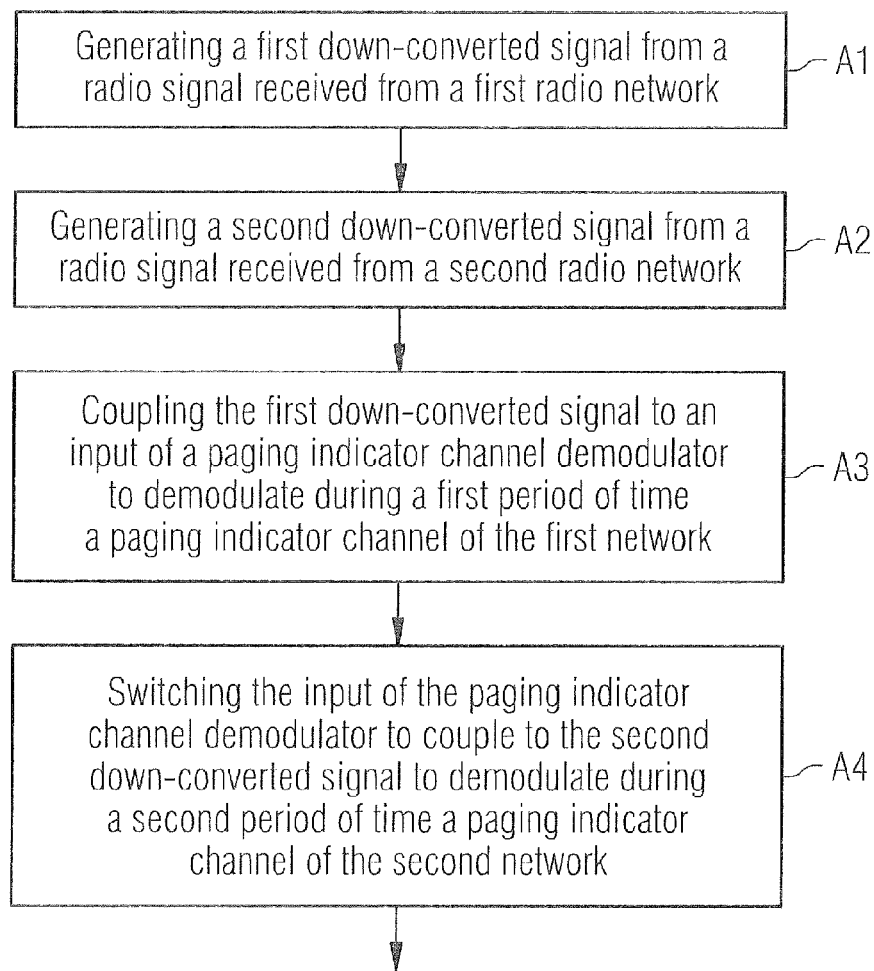
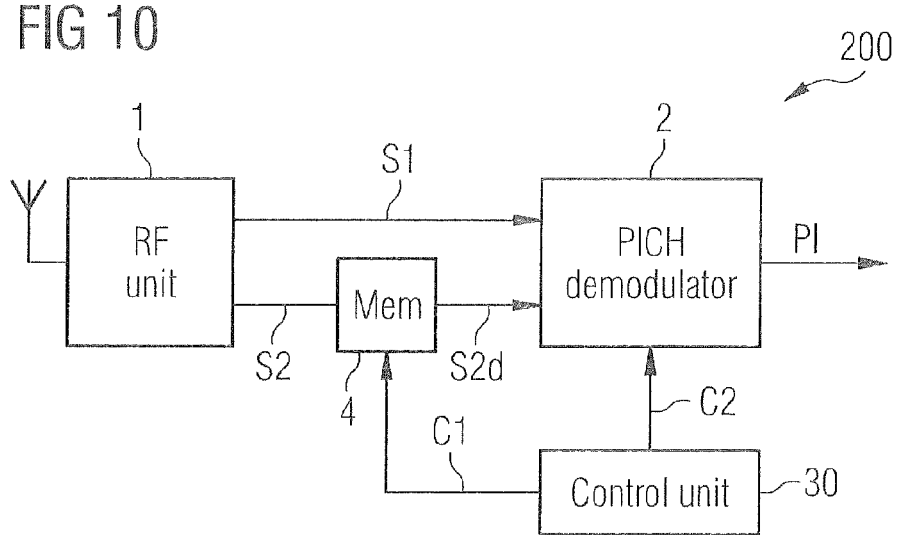

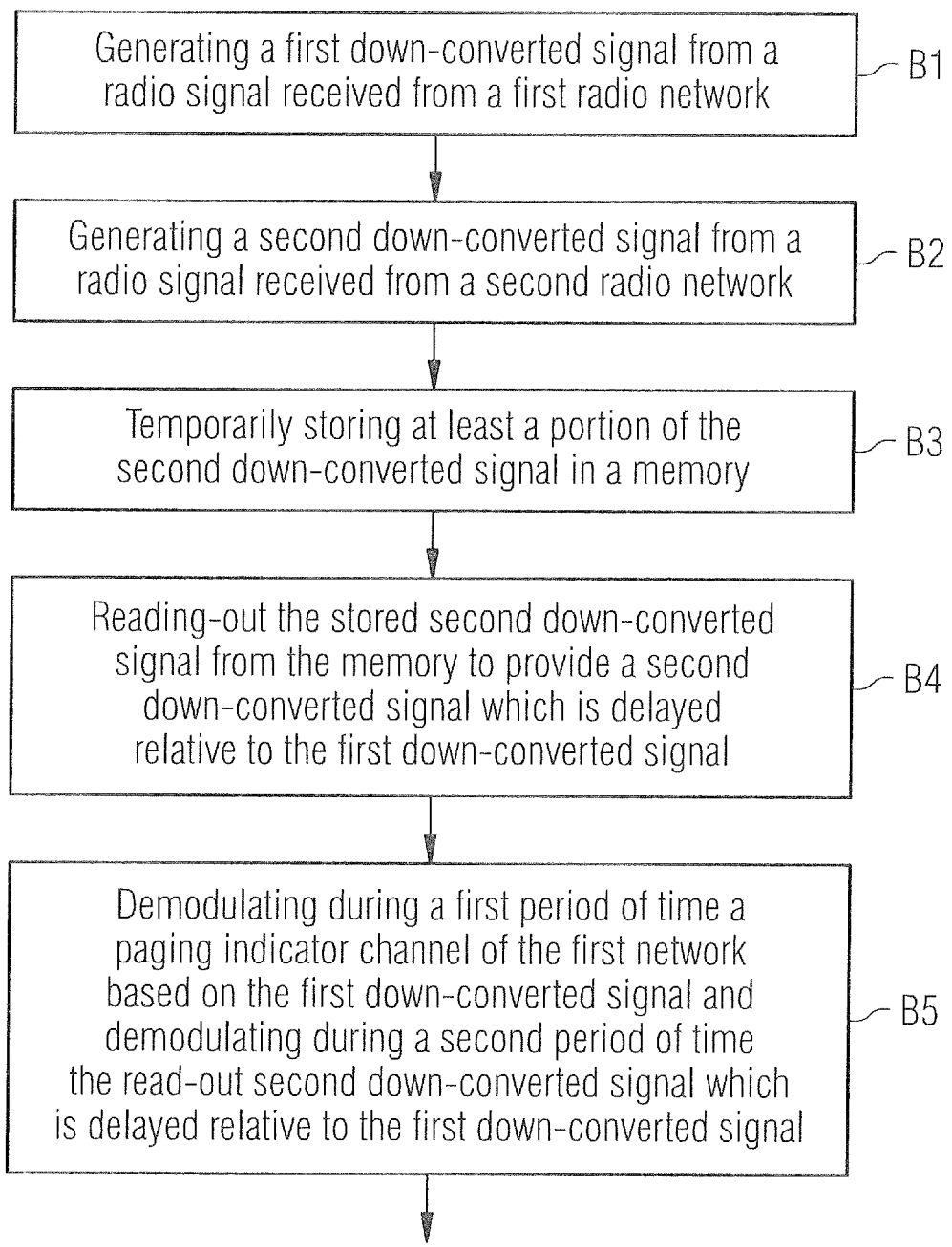

MOBILE COMMUNICATIONS RADIO RECEIVER FOR MULTIPLE NETWORK OPERATION

FIELD

The invention relates to mobile communications, and more particularly to the technique of receiving and processing pagings from multiple networks.

BACKGROUND

A new feature for receivers in mobile communications is Dual-SIM-Dual-Standby (DSDS). It means the UE (user equipment) contains (at least) two SIM (subscriber identity module) cards and registers in (at least) two networks. If the UE is in an idle/standby state, it is able to receive pagings, i.e. notifications of incoming calls or messages, from both networks.

A straight-forward approach to avoid missing of a paging is to add a second receive path to the UE. However, this means additional hardware, implying additional chip area and power consumption.

For these and other reasons there is a need for the present invention.

BRIEF DESCRIPTION OF THE DRAWINGS

The accompanying drawings are included to provide a further understanding of embodiments and are incorporated in and constitute part of this specification. The drawings illustrate embodiments and together with the description serve to explain principles of embodiments. Other embodiments and many of the intended advantages of embodiments will be readily appreciated as they will become better understood by reference to the following detailed description. Like reference numerals designate corresponding similar parts.

FIG. 4 is diagram illustrating by way of example a possible structure of a paging indicator channel and a control channel associated therewith.

FIG. 5 is a timing diagram of paging indicator channel frames and paging channels transmitted by two radio networks.

FIG. 6 is a timing diagram of an embodiment of a method of listening to pagings transmitted by multiple radio networks.

FIG. 9 is a flowchart of an embodiment of a method of listening to pagings transmitted by multiple networks.

FIG. 10 is block diagram illustrating an embodiment of a mobile communications radio receiver.

FIG. 13 is a flowchart of an embodiment of a method of listening to pagings transmitted by multiple networks.

DETAILED DESCRIPTION

Figure 1:
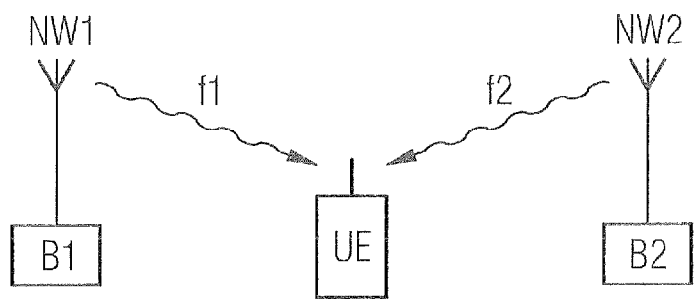
FIG. 1 is an illustration of a first multiple network scenario for a mobile communications radio receiver.

In the following detailed description, reference is made to the accompanying drawings, which form a part thereof, and in which are shown by way of illustration specific embodiments in which the invention may be practiced. In the drawings, like reference numerals are generally utilized to refer to like elements throughout the description. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in a simplified representation in order to facilitate describing one or more aspects of the embodiments of the invention. The following description is therefore not to be taken in a limiting sense, and the scope of the invention is defined by the appended claims.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure. In particular, it is to be understood that the features of the various exemplary embodiments described herein may be combined with each other, unless specifically noted otherwise.

As employed in this specification, the terms "coupled" and/or "electrically coupled" are not meant to mean that the elements must be directly coupled together; intervening elements may be provided between the "coupled" or "electrically coupled" elements.

The mobile communications radio receiver described herein will be referred to as UE (user equipment) and may be employed in terminal devices of wireless communication systems, in particular in mobile phones or other mobile terminal devices.

By way of example, FIG. 1 illustrates a first multiple network scenario for a mobile communications radio receiver (UE). The UE is configured to register in two networks NW1 and NW2. In this embodiment, the networks NW1 and NW2 are operated on different frequency bands f1 and f2. Thus, since the UE must be available to receive pagings from the NW1 operator and the NW2 operator, the UE must be able to tune to frequency bands f1 and f2. By way of example, as shown in FIG. 1, different base stations B1, B2 (i.e. different cells) may be used by the networks NW1 and NW2. However, it is also possible that networks NW1 and NW2 use shared base stations, wherein B1=B2 (i.e. the same cells).

Figure 2:
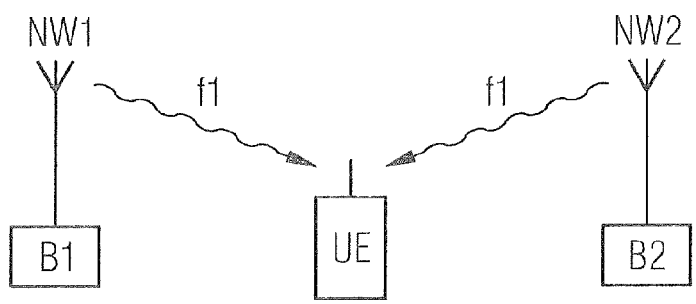
FIG. 2 is an illustration of a second multiple network scenario for a mobile communications radio receiver.

FIG. 2 illustrates a second multiple network scenario for a UE. The UE is configured to register in two networks NW1 and NW2. In contrast to the scenario illustrated in FIG. 1, the networks NW1 and NW2 are operated on the same frequency band f1. Thus, the UE 1 is available to receive pagings from the NW1 operator and the NW2 operator if tuned to frequency band f1. By way of example, as shown in FIG. 2, different base stations B1, B2 (i.e. different cells) may be used by the networks NW1 and NW2. However, it is also possible that networks NW1 and NW2 use shared base stations, wherein B1=B2 (i.e. the same cells).

Figure 3:
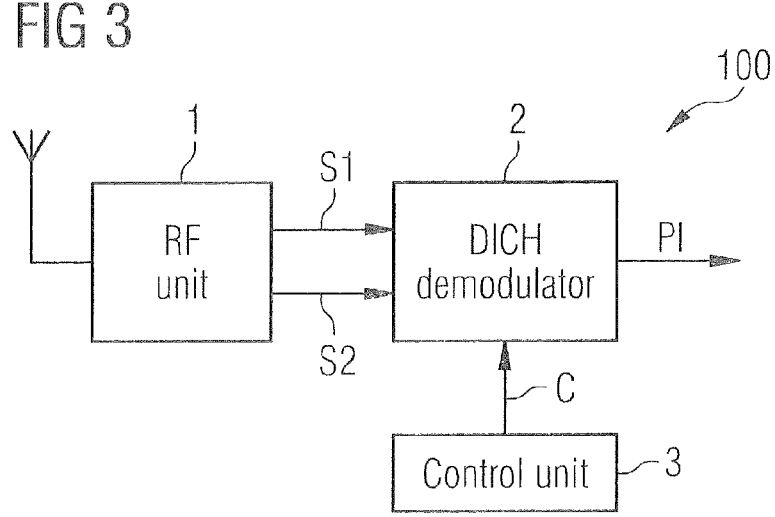
FIG. 3 is block diagram illustrating an embodiment of a mobile communications radio receiver.

FIG. 3 is a block diagram illustrating an embodiment of a UE 100. UE 100 comprises an RF unit 1, one paging indicator channel (PICH) demodulator 2 coupled to the RF unit 1 and a control unit 3. The RF unit 1 generates a first down-converted signal S1 from a radio signal received from network NW1 and a second down-converted signal S2 from a radio signal received from network NW2.

The first down-converted signal S1 and the second down-converted signal S2 may be fed into the PICH demodulator 2. The PICH demodulator 2 is configured to demodulate during a first period of time a first PICH of NW1 based on the first down-converted signal S1 and during a second period of time a second PICH of NW2 based on the second down-converted signal S2. The timing of the demodulation phases (i.e. the first and second periods of time) is controlled by the control unit 3. The control unit 3 generates a control signal C coupled to a control input of the PICH demodulator 2. The control signal C indicates the first time period in which the PICH demodulator 2 demodulates the first down-converted signal S1 and the second time period in which the PICH demodulator 2 demodulates the second down-converted signal S2. By way of example, the control signal C may control a selector switch (not shown in FIG. 3) which selects one of the signals S1 and S2 to be demodulated by the PICH demodulator 2. Such selector switch could be arranged outside the PICH demodulator 2 and/or at any position in the signal path between the RF unit 1 and the PICH demodulator 2.

In one embodiment, the first period of time and the second period of time are consecutive time periods.

In one embodiment, the UE 100 may alternatingly listen to the first PICH and to the second PICH with respect to consecutive first and second time periods. In this case, even if the paging indicators (PIs) of the first PICH and the second PICH overlap and therefore, one of these simultaneous PIs can not be detected, the PIs of both channels are usually detected after one repetition cycle of PI transmission on each channel. This will be explained in greater detail further below.

In one embodiment, the first period of time and/or the second period of time are paging intervals of the first PICH or are at least of the same length as the paging intervals of the first PICH. Further, the paging intervals of the first and second PICH may have the same length.

FIG. 4 is diagram illustrating by way of example a possible structure of a PICH and a control channel associated with the PICH and referred to as SCCPCH (Secondary Common Control Physical Channel). PICH and SCCPCH are used for pagings in general WCDMA systems.

The PICH is repeatedly transmitted over radio frames having a length of, e.g., 10 ms, i.e. the length of UMTS (Universal Mobile Telecommunications System) radio frames. The PICH is used to carry the PI. The PICH is always associated with an SCCPCH to which a PCH (Paging CHannel) is mapped. There is a time difference of $T_{PICH}$ between the PICH frame and the SCCPCH frame associated with the PICH frame. A PI set in a PICH frame means that a paging message is to be transmitted on the PCH in the SCCPCH frame. In other words, the SCCPCH frame is transmitted $T_{PICH}$ after the end of the PICH frame. The time gap $T_{PICH}$ between the PICH and SCCPCH frames may be between 2 ms (3 slots) and 20 ms (30 slots).

The UE 100 may use discontinuous reception (DRX) in idle mode in order to reduce power consumption. The terms idle mode and standby mode are used synonymously in this description. When DRX is used, the UE 100 needs only to monitor the PICH at one known time (so-called paging occasion) during the paging interval (so-called DRX cycle).

FIG. 5 is a general illustration of the timing of the PICH frame and the PCH (mapped to SCCPCH) of two networks NW1 and NW2 when transmitted over two cells A and B. Time t means the time of processing these channels at the UE 100. Further, by way of example, only one of the repetitive paging intervals (DRX cycles) is depicted in FIG. 5. The duration of the paging intervals may be e.g. between 80 and 5120 ms (corresponding to the variable length of a DRX cycle in UMTS). The paging intervals of NW1 and NW2 may be of identical length. As FIG. 5 considers two cells A and B, the time offset (Toff) between the PICH frames of NW1 and NW2 may vary, e.g. because of UE 100 movement. If NW1 and NW2 transmissions in the same cell are considered, the time offset Toff may be arbitrary (because NW1 and NW2 transmissions are not correlated) but fixed (if the same DRX cycle lengths are used by NW1 and NW2).

In general, when PIs of NW1 and NW2 do not overlap, the PICH demodulator 2 can be controlled by control unit 3 to demodulate the PICH of NW1 based on S1 during the (known) paging instant of NW1 and can then be switched to demodulate the PICH of NW2 based on S2 during the paging instant of NW2. However, if the time instances of PI on NW1 and PI on NW2 overlap, the UE can only listen to the pagings of one of the networks NW1 or NW2. Note that if the time instances of PI on NW1 and PI on NW2 (i.e. the possible paging instances in the networks) overlap, they typically overlap always.

In FIG. 6, by way of example, the timing of PIs in the PICHs of NW1 and NW2 are shown over time t. The PIs in the PICH of NW1 are denoted by PI1(NW1), PI2(NW1), PI3 (NW1), . . . , and the PIs of the PICH of NW2 are denoted by PI1(NW2), PI2(NW2), PI3(NW2), . . . FIG. 6 illustrates a case where the PIs of NW1 and NW2 occur at the same time, i.e. PI1(NW1) and PI1(NW2) occur at $t_1$, PI2(NW1) and PI2(NW3) occur at $t_2$ and PI3(NW1) and PI3(NW2) occur at $t_3$. In other words, FIG. 6 illustrates the case of overlapping PIs in two networks NW1 and NW2 received by UE 100 when operated in an idle mode (DSDS mode). Note that in DSDS, there is no active connection (e.g. a call) on any of the networks NW1 and NW2 to UE 100.

In the following, the case of overlapping PIs of NW1 and NW2 will be referred to as collision. Further, in a more general meaning, the term collision will already be used if the PICH frames of NW1 and NW2 overlap in time.

Further, FIG. 6 illustrates first control time periods [C1 (NW1),C2(NW1)] and [C3(NW1),C4(NW1)] in which the PICH demodulator 2 is controlled by the control unit 3 to demodulate S1 and a second control time period [C2(NW1), C3(NW1)] in which the PICH demodulator 2 is controlled by the control unit 3 to demodulate S2. Note that the series of control time periods may continue to comprise further first control time periods [C5(NW1), C6(NW1)], [C7(NW1), C8(NW1)], . . . and second control time periods [C4(NW1), C5(NW1)], [C6(NW1), C7(NW1)], . . . not shown in FIG. 6.

In one embodiment, the first and second control time periods may be continuous over time.

In one embodiment, the first and second control time periods may have the same length (i.e. duration). The length may be identical to the length of the paging intervals (DRX cycle) of NW1.

In one embodiment, as shown in FIG. 6, the first and second control time periods may correspond to the paging intervals of NW1. In this case, the beginnings C1(NW1), C2(NW1), C3(NW1), C4(NW1), . . . of the control time periods correspond to the paging interval or DRX cycle boundaries in NW1.

In one embodiment, the first and second control time periods may correspond to the paging intervals of NW2. In this case, the paging interval or DRX cycle boundaries C1(NW2), C2(NW2), C3(NW2), . . . in NW2 correspond to the beginnings of the control time periods.

According to one embodiment, the PICH demodulator 2 is controlled by the control unit 3 to demodulate during a first control time period (e.g. paging interval of NW1) the PICH of NW1 and to demodulate during the next control time period (e.g. next paging interval of NW1) the PICH of NW2. Thus, during the control time period [C1(NW1),C2(NW1)], the UE 100 might miss a PI on NW2 (such missed PI is denoted by PI1(NW2) in FIG. 6). However, since the PICH demodulator 2 is controlled during the next control time period [C2(NW1),C3(NW1)] to demodulate the PICH of NW2, a next PI occurring on NW2 is usually detected during the next control time period [C2(NW1),C3(NW1)]—this detected PI on NW2 is denoted by PI2(NW2) in FIG. 6. Note that the times during which the UE 100 listens to NW1 and the times during which the UE 100 listens to NW2 are marked-up in FIG. 6 by hatched areas.

Embodiments described herein exploit the fact that the pagings PI are repeated several times by the networks NW1. NW2 and that the lengths of PI and $T_{PICH}$ are typically small compared to the length of the paging intervals used in NW1 and NW2. This will be explained in more detail the following by way of a numerical example:

Assuming a paging interval length in NW1 and NW2 of 1000 ms, the probability of overlapping PIs is approximately (2*length PI)/(length paging interval)=(2*10 ms)/(1000 ms)=2%. Here, the factor 2 is due to the fact that the two networks NW1. NW2 will typically not be time aligned and that also only partially overlapping PIs can not be received simultaneously. Further, it is to be noted that in this example, the length of a PI is assumed to be 10 ms, i.e. is set to be the length of a PICH, although the actual length of a PI is much shorter. Therefore, in the numerical example set out above, the situation shown in FIG. 6 of overlapping PIs (or, at least, overlapping PICHs) occur in 2% of the cases.

With the proposed solution of alternatingly listening to two (or more) networks NW1. NW2 during consecutive control time periods (e.g. paging intervals), PIs on both (all) networks can always be received. By way of example, if three repetitions of the pagings are assumed, that is a PI is transmitted in each of the networks NW1. NW2 during four consecutive paging intervals, alternating listening to the two networks NW1, NW2 by the UE 100 will have two chances (instead of original four) to read the PI from one network NW1 or NW2. Assuming a missed detection rate of 1% for the PI, the chance to miss a paging is $(1\%)^2=0.01\%$, which is negligible. It is to be noted that even for quite bad radio conditions (Ior/Ioc=−3 dB), the Global Certification Forum (GCF) test of 3GPP ($3^{rd}$ Generation Partnership Program) only allows for a maximum 1% error rate of PI and PICH detection combined. Therefore, a missed paging rate of 0.01% or less should always be reached in real applications.

Another evaluation parameter to be considered is the false alarm rate of the method. A false alarm on NW1 may block the PI reception on NW2 because of the necessity to read the PCH on NW1 associated with the PI detection on NW1 to detect the false alarm. A false alarm is detected if the reading of PCH of NW1 yields no valid paging data. The overlapping probability of PI on NW2 and PCH on NW1 is approximately (length PI+length PCH)/(length paging interval)=(10 ms+30 ms)/(1000 ms)=4%. Again, an exaggerated PI length of 10 ms (i.e. the PICH length) is assumed. If a false alarm rate of 1% (similar to the missed detection rate) is assumed, which is quite high for realistic scenarios, the probability for a false alarm on NW1 blocking the detection of a PI on NW2 is 0.01*4%=0.04%.

Thus, assuming a paging interval length of 1000 ms and a control time period of identical length, the proposed solution yields a negligible 0.01% missed paging probability and a negligible 0.04% false alarm PI blocking probability. The delay to receive the PI on NW2 is typically one paging interval in the range of e.g. 80 ms-5120 ms. Usually, such delay will not be noticed by the user of the UE 100.

In one embodiment the PICH demodulator 2 is controlled by the control unit 3 to switch alternatingly from NW1 to NW2 and vice versa during consecutive first and second control time periods, which may correspond to consecutive paging intervals of NW1.

In one embodiment the switching between network NW1 and NW2 for PI reading is not strictly alternating but is accomplished with uneven priorities. By way of example, the PICH demodulator 2 may be controlled by the control unit 3 to listen for two consecutive paging intervals [C1(NW1),C2(NW1)] and [C2(NW1),C3(NW1)] to the PICH of NW1, during the next paging interval [C3(NW1),C4(NW1)] to the PICH of NW2 and then reiterates this 2:1 priority scheme. In general, all priority settings n1:n2 with n1 being the number of consecutive paging intervals for listening to NW1 and n2 being the number of consecutive paging intervals for listening to NW2 are feasible, wherein n1 may be different to n2.

In one embodiment the priorities are set by the end user who operates the UE 100. The end user may set the desired network priorities via a keypad of the UE 100 coupled to the control unit 3.

In one embodiment the priorities are set based on channel quality information such as e.g. SNR (signal-to-noise ratio) data of S1 and S2, respectively. The worse the SNR of S1 compared to the SNR of S2, the more often the UE 100 should monitor NW1. Thus, e.g. in this case, n1 may be chosen to be greater than n2. On the other hand, the worse the SNR of S2 compared to the SNR of S1, the more often the UE 100 should monitor NW2. Thus, e.g. in this case, n2 may be chosen to be greater than n1. The priority settings may be determined by the control unit 3 without any user interaction in one embodiment.

More specifically, in one embodiment, the control unit 3 may evaluate the number of PI repetitions of multiple networks NW1, NW2, . . . to which the UE 100 is registered in idle mode. Based on each of the number of PI repetitions, the control unit 3 may decide on priorities n1, n2, . . . to determine each time length during which the PICH demodulator 2 is switched to each one of the networks NW1, NW2, . . . to which the UE 100 is registered. Also in this case, the priority settings may be determined by the control unit 3 without any user interaction.

In one embodiment the priorities are set based on network information about the number of repetitions of PI transmissions for signaling a message or a call. By way of example, if NW1 repeats the PI to signal a message or call more often than NW2, the PICH of NW2 may be monitored more frequently than the PICH of NW1. Thus, in this case, n2 may be chosen to be greater than n1.

More specifically, in this embodiment, the control unit 3 may evaluate the number of PI repetitions of each of the multiple networks NW1, NW2, . . . to which the UE 100 is registered in idle mode. Based on each of the numbers of PI repetitions, the control unit 3 may decide on priorities n1, n2, . . . to determine each time length during which the PICH demodulator 2 is switched to each one of the networks NW1, NW2, ... to which the UE 100 is registered. The priority settings may be accomplished by the control unit 3 without any user interaction.

In one embodiment the priorities are set based on channel quality information. Such information may be generated by measurement of the channel quality in the UE and may be used to determine the priorities n1, n2, ... without any user interaction.

Figure 7:
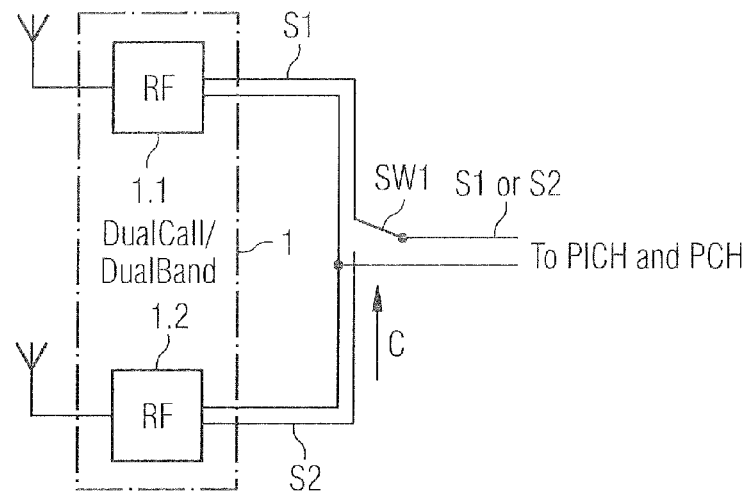
FIG. 7 is block diagram illustrating circuitry of an embodiment of a mobile communications radio receiver.

FIG. 7 illustrates a block diagram of one embodiment of an RF unit 1 and a switch SW1 for selecting S1 or S2 based on a control signal C provided by the control unit 3. Here, the RF unit 1 comprises two RF stages 1.1 and 1.2. The RF stages 1.1 and 1.2 may be tuned to different frequency bands. RF stage 1.1 provides the first down-converted signal S1 from a radio signal received from network NW1 and RF stage 1.2 provides the second down-converted signal S2 from a radio signal received from network NW2. Thus, the RF unit 1 may be used in a dual cell/dual band environment using different frequency bands for transmissions of networks NW1 and NW2.

Switch SW1 is operated based on the control signal C. In one switch position, signal S1 is routed to the PICH and the PCH(SCCPCH) demodulators, and in the other switch position, signal S2 is routed to the PICH and the PCH(SCCPCH) demodulators. The control signal C may be generated in control unit 3 (see FIG. 3) based on quantities as described before (e.g. according to user settings, network operator settings, network PI repetition information, channel quality information, etc.).

Figure 8:
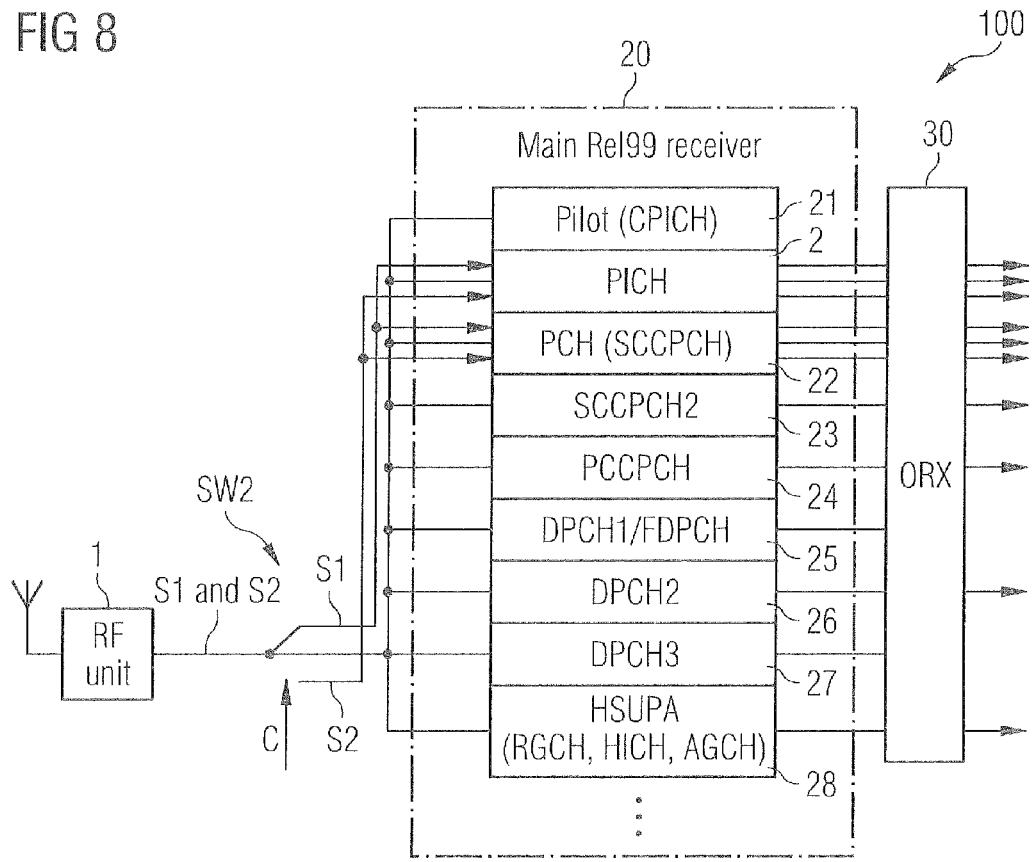
FIG. 8 is block diagram illustrating an embodiment of a mobile communications radio receiver.

FIG. 8 illustrates a block diagram of one embodiment of a UE 100. Further to the description of the aforementioned embodiments, FIG. 8 illustrates the UE 100 to contain a main receiver 20 and a channel decoder 30. The main receiver 20, which may be an UMTS Rel99 receiver, comprises a number of demodulators, e.g. a CPICH (Common Pilot CHannel) demodulator 21 for pilot demodulation, a PCH(SCCPCH) demodulator 22 for PCH demodulation in case a PI is detected by the PICH demodulator 2, a second SCCPCH demodulator 23, a PCCPCH (Primary Common Control Physical CHannel) demodulator 24, a DPCH1/FDPCH (Dedicated Physical CHannel/Fractional Dedicated Physical CHannel) demodulator 25, two additional DPCH demodulators 26, 27 and a HSUPA (High Speed Uplink Packet Access) demodulator 28 demodulating the corresponding RGCH (Relative Grant CHannel), HIGH (Hybrid ARQ Indicator CHannel) and AGCH (Absolute Grant CHannel). It is to be noted that each embodiment described herein may employ one or more of these demodulators 21 to 28. Further, it is to be noted that UE 100 may only contain one single main receiver 20.

The channel decoder 30 may comprise respective channel decoders for each demodulated channel signal. The channel decoder 30, also referred to as outer receiver (ORX) in the art, may comprise a number of channel decoders (not shown in detail) with each channel decoder being configured to decode a specific channel signal received from one channel demodulator 21 to 28 of the main receiver 20. This multiple channel decoder configuration is indicated in FIG. 8 by the multiplicity of signals (arrows) entering and leaving the ORX channel decoder 30. As known in the art, the main receiver is also referred to inner receiver (IRX) and may, for instance, be implemented by a RAKE receiver.

The PCH/SCCPCH needs only to be received in the DSDS mode if a PI is detected on the PICH of one of the radio networks NW1, NW2 to which the UE 100 is registered. In this case, the PCH/SCCPCH associated with the PICH of the radio network under consideration is read. If the PI is correct, the call is set-up on this network and/or a message is received on this network and there is no necessity to listen to the other network because the DSDS mode has then been terminated.

In all embodiments, the UE 100 does not require any or only very small hardware changes compared to a conventional UE configured to register only in one radio network. In particular, only a single PICH demodulator 2 may be provided in UE 100. The control unit 3 for switching the PICH demodulator 2 through different radio networks may be implemented in firmware or in dedicated hardware.

FIG. 9 is a flowchart of an embodiment of a method of listening to pagings transmitted by multiple radio networks at A1. In a first step, a first down-converted signal S1 from a radio signal received from a first radio network NW1 is generated. Further, a second down-converted signal S2 from a radio signal received from a second radio network NW2 is generated at A2.

The first down-converted signal S1 is coupled to an input of a PICH demodulator 2 to demodulate during a first period of time a PICH of the first radio network NW1 at A3. Then, the input of the PICH demodulator is switched to couple to the second down-converted signal S2 to demodulate during a second period of time a PICH of the second network NW2 at A4. Thus, the same PI processing hardware, namely the same PICH demodulator 2, is used to demodulate the PICH of the first radio network NW1 and the PICH of the second radio network NW2.

FIG. 10 is a block diagram illustrating one embodiment of a UE 200. UE 200 comprises an RF unit 1, a PICH demodulator 2, a memory 4 and a control unit 30.

The design and operation of the RF unit 1 to generate signals S1 and S2 are the same as described for UE 100 in the aforementioned embodiments, and reiteration of the corresponding description is avoided for the sake of brevity. In UE 200 the second down converted signal S2 generated from a radio signal received from NW2 is temporarily stored in memory 4. A signal S2$d$ is output from memory 4 and coupled to an input of the PICH demodulator 2. Signal S2$d$ is a delayed version of signal S2 produced by the RF unit 1.

For detecting a PI on the PICH of NW1 and a PI on the PICH of NW2, the UE 200 uses the time gap between detecting the PI on the PICH of NW1 and the beginning of the associated PCH/SCCPCH frame for reading the paging message. As mentioned earlier in conjunction with FIG. 4, this time gap is at least $T_{PICH}$, i.e. 2 ms or greater.

A time gap of 2 ms is sufficient for detecting the PI on the PICH of NW2. It is to be noted that a PI on PICH only uses a specific part of the PICH frame having a duration of e.g. 10 ms. Two UMTS slots, i.e. a period of about 1.3 ms, is sufficient for acquisition and channel estimation of NW2 to process at least that portion of the second down-converted signal S2 which may contain the PI of NW2. Thus, in other words, the processing of a PI transmitted over NW2 fits into the time gap $T_{PICH}$ between the PICH frame and the associated PCH/SCCPCH frame of NW1.

Again, a conflict scenario as described in conjunction with FIG. 6 is considered in which the PI on the PICH of NW1 overlaps or coincides with the PI on the PICH of NW2. In this case, without memory 4, the PICH demodulator 2 could only demodulate the PI of NW1 or, alternatively, the PI of NW2 as explained above with respect to FIGS. 3 to 6. However, in UE 200 the second down-converted signal S2 from RF unit 1 is delayed in memory 4, i.e. a delayed second down-converted signal S2$d$ output of memory 4 is fed into the PICH demodulator 2. The write-read delay produced by memory 4 is set such that a PI on the PICH of NW2 will be processed in the time gap between the reading of PI on the PICH of NW1 and the associated PCH/SCCPCH processing of NW1.

Figure 11:
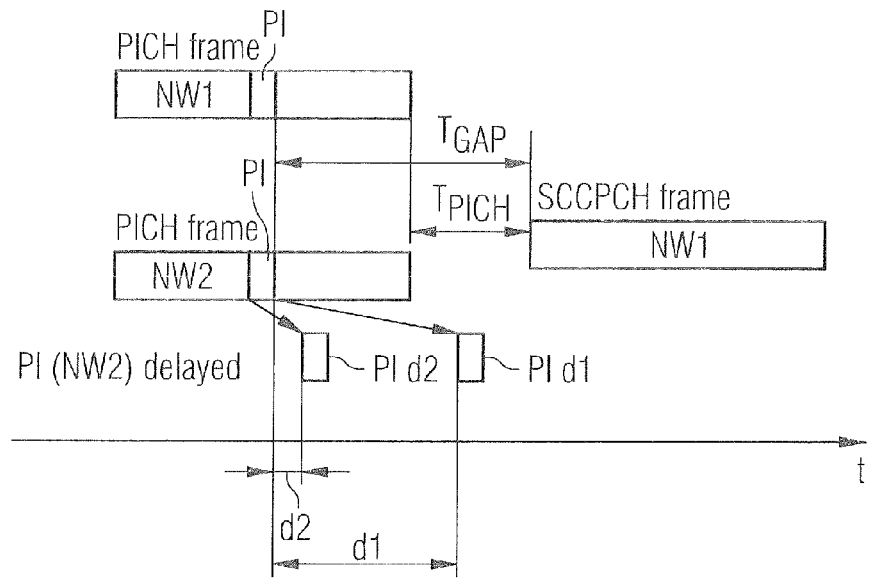
FIG. 11 is a timing diagram of an embodiment of a method of processing pagings transmitted by multiple radio networks.

The delay of signal S2 and the operation of the PICH demodulator 2 are illustrated in FIG. 11. FIG. 11 shows overlapping or coinciding PIs in PICH frames of NW1 and NW2. The time gap between PI on the PICH frame of NW1 and the beginning of the associated SCCPCH frame of NW1 is $T_{GAP}$. The minimum duration of $T_{GAP}$ is about $T_{PICH}$.

Further, two delayed versions of the PI on the PICH frame of NW2 are illustrated in FIG. 7. The first delayed version PId1 is delayed by a delay d1 to be received by the PICH demodulator 2 within $T_{PICH}$ of NW1. The second delayed version PId2 is delayed by a delay d2 to be received by the PICH demodulator 2 within $T_{GAP}$ of NW1.

In other words, the UE 200 accomplishes its regular PI processing for the first down-converted signal S1 of NW1, but stores the necessary e.g. two slots of the down-converted signal S2 of NW2 in which the PI is expected in memory 4. When the processing to detect a PI on the PICH frame of NW1 in PICH demodulator 2 is finished, the decision PI positive or PI negative on NW1 is taken. If the PI decision on NW1 is negative (i.e. no PI is detected) the same PI processing hardware, namely PICH demodulator 2, is used to process the stored signal samples of the second down-converted signal S2d from NW2 to decode any PI on the PICH frame of NW2. If this PI detection on NW2 is positive, there is still sufficient time to start decoding of the PCH/SCCPCH frame on NW2.

In the very rare event that on both radio networks NW1 and NW2 a positive PI detection is determined on the same instant, the control unit 30 may be configured to make a priority decision which PCH/SCCPCH of NW1 or NW2 is to be read. This decision may be made based on user settings, network settings, PI detection reliability or channel quality, etc. As mentioned before in connection with UE 100, the priority decision settings may be made with or without user interaction.

By way of example, it may be assumed that the processing of PCH/SCCPCH of NW1 is prioritized. In case of a false alarm on the prioritized network NW1, there are several options. In one embodiment the other radio network NW2 could be prioritized in the next or a subsequent paging interval. In another embodiment, in case of a false alarm on the prioritized network NW1, a positive PI detection on the PICH of NW2 can be set as default for the next PI detection to avoid a missed detection for the PI on the PICH of NW2 in the next paging interval.

The control unit 30 may be configured to control the memory 4 by a control signal C1 and the PICH demodulator 2 by a control signal C2. The control signal C1 may control the timing of the read-out operation, i.e. the delay of the read-out signal portion S2d of the signal S2 relative to the signal S1. Such delays are depicted in FIG. 11 and are denoted by d1 and d2.

Further, the control signal C2 is used to switch the PICH demodulator 2 from PI detection on NW1 to PI detection on NW2 and vice versa. Thus, the control signal C2 corresponds to the control signal C in the aforementioned embodiments. Here, in contrast to the processing in UE 100 as illustrated in FIG. 6, the PIs of both (all) radio networks NW1, NW2, ..., to which the UE 200 is registered in an idle mode (DSDS) are processed during one (e.g. each) paging interval (DRX cycle) of NW1 or NW2. Therefore, the processing illustrated in FIG. 11 of UE 200 allows for full parallel reception of two (all) pagings in DSDS in each paging interval without any degradation in missed detection or false alarm rates.

It is to be noted that the temporary storage of the second down-converted signal S2 or a PI containing portion thereof in memory 4 may require no or only negligible extra hardware or software expenditure. One may reuse for example memory which is existing in the UE 200 but not used in the paging state. Thus, the portion of the signal S2 where the PI of NW2 is contained may be stored in a RAM unused in the paging state of the UE 200 and then be processed in the time gap between PI and SCCPCH/PCH as already explained.

Figure 12:
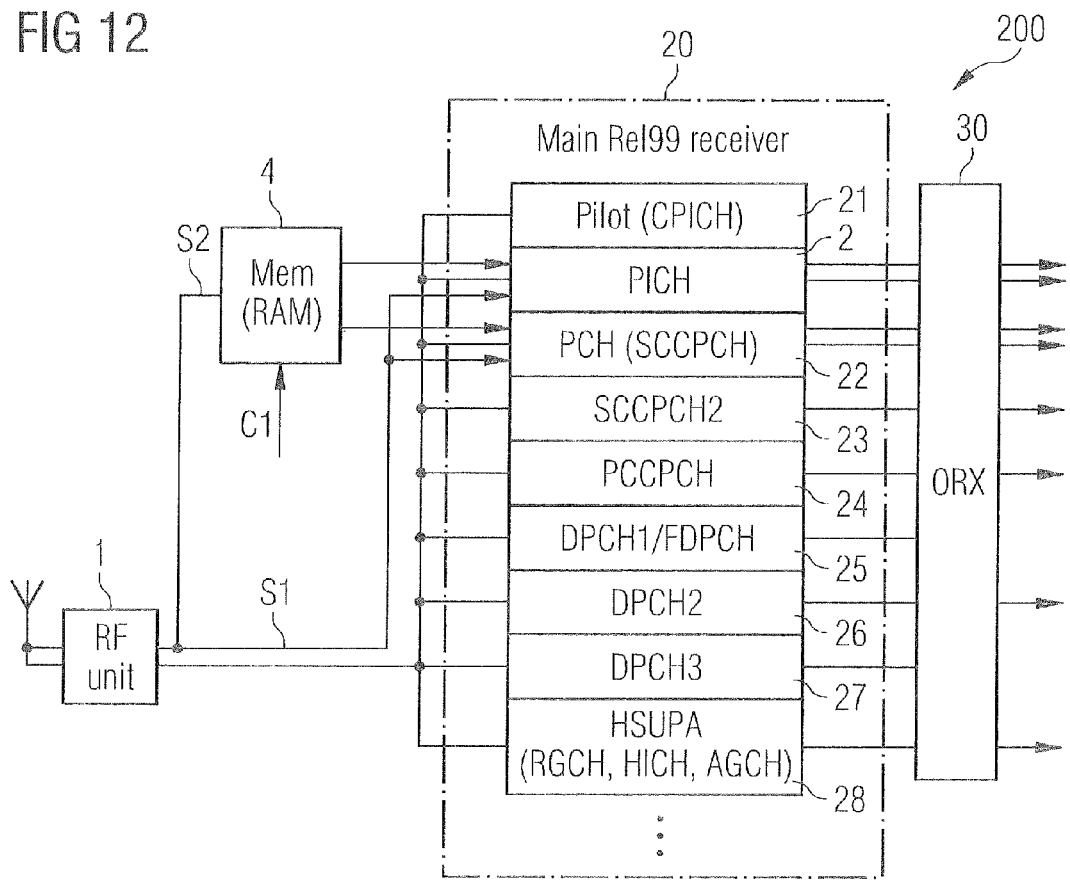
FIG. 12 is block diagram illustrating an embodiment of a mobile communications radio receiver.

FIG. 12 illustrates a block diagram of one embodiment of UE 200. Further to the description to the aforementioned embodiments, FIG. 12 illustrates the UE 200 to contain a main receiver 20 and a channel decoder 30. The main receiver 20, which may be an UMTS Rel99 receiver, may comprise a number of demodulators, e.g. demodulators 21 to 28 as already described in conjunction with FIG. 8. Further, the channel decoder 30 may comprise respective channel decoders for each demodulated channel signal similar to channel decoder 30 as described before.

Further to FIG. 12, the down-converted signal S1 from NW1 comprises PI and PCH data of NW1, and the down-converted signal S2 from NW2 comprises PI and PCH data from NW2. The PI and PCH data of NW1 is coupled to the PICH demodulator 2 and the PCH(SCCPCH) demodulator 22 of the main receiver 20. The PI and PCH data of NW2 is delayed in memory 4 as explained above and the delayed version thereof is coupled to the same PICH demodulator 2 and may be coupled to the same PCH(SCCPCH) demodulator 22 which are used to demodulate the PI and PICH data of NW1 contained in S1, respectively.

The channel decoder 30 may be an ORX channel decoder having respective channel decoders for each demodulated channel signal as described above in conjunction with FIG. 8.

FIG. 13 is a flowchart of an embodiment of a method of listening to pagings transmitted by multiple networks. In a first step at B1, a first down-converted signal S1 from a radio signal received from a first radio network NW1 is generated. Further, a second down-converted signal S2 from a radio signal received from a second radio network NW2 is generated at B2. Then, at least a portion of the second down-converted signal is temporarily stored in a memory at B3.

By reading-out the second down-converted signal from the memory a second down-converted signal S2d is provided at B4, which is delayed relative to the first down-converted signal S1.

The first down-converted signal S1 is coupled to an input of the PICH demodulator 2 to demodulate during a first period of time a PICH of the first radio network NW1. Then, during a second period of time, a PICH of the second network NW2 is demodulated for PI detection based on the delayed second down-converted signal Sd2 output of the memory 4 at B5.

Further, in relation to all embodiments described herein, it is to be noted that many of the today's UES are already provided with two (or multiple) RF units that are needed in the case of the scenario of FIG. 1 where NW1 and NW2 are operated on different frequency bands f1 and f2. In this case the RF unit 1 of FIGS. 3, 8, 10 and 12 is actually implemented by two separate RF units, with the first RF unit generating the first down-converted signal S1 and the second RF unit generating the second down-converted signal S2. For instance, the recent UMTS releases employ features like Dual-Band HSDPA. In Dual-Band HSDPA receivers the respective RF hardware is capable of tuning to two different frequency bands f1, f2. For Dual-Band HSDPA these bands would be transmitted from the same network or operator. However, the respective RF hardware could be used without any modifications as RF unit 1 in UE 100 or UE 200 for dual paging detection in two different networks NW1, NW2, because HSDPA is inactive in the DSDS paging mode.

Thus, in both embodiments 100 and 200, improved reception of PIs from two networks with the DSDS feature without additional hardware or with only minimal hardware changes are implemented. Only the control and, in UE 200, the data routing has to be adapted to enable the enhanced functionality.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. This application is intended to cover any adaptations or variations of the specific embodiments discussed herein, and the invention is intended to be limited only by the claims and the equivalence thereof.

What is claimed is:

1. A mobile communications radio receiver for multiple radio network operation, comprising:
    an RF unit configured to generate a first down-converted signal from a radio signal received from a first radio network and a second down-converted signal from a radio signal received from a second radio network, and
    a paging indicator channel demodulator configured to demodulate during a first period of time a paging indicator channel of the first radio network based on the first down-converted signal, and demodulate during a second period of time a paging indicator channel of the second radio network based on the second down-converted signal,
    wherein the first period of time and the second period of time correspond to two consecutive sets of one or more paging intervals of the first paging indicator channel, and
    a control unit configured to switch the paging indicator channel demodulator between the first and second radio network based on a priority setting,
    wherein the priority setting is adjustable via the mobile communications radio receiver, and
    wherein the priority setting is automatically adjusted by the control unit based at least in part on a first channel quality of the radio signal received from the first radio network and on a second channel quality of the radio signal received from the second radio network.

2. The mobile communications radio receiver of claim 1, wherein the paging indicator channel demodulator is configured to alternatingly demodulate the paging indicator channel of the first radio network based on the first down-converted signal and the paging indicator channel of the second radio network based on the second down-converted signal during consecutive periods of time.

3. The mobile communications radio receiver of claim 1, wherein the first period of time corresponds to n1 consecutive paging intervals of the first paging indicator channel and the second period of time corresponds to n2 consecutive paging intervals of the first paging indicator channel, wherein n1 and n2 are different.

4. The mobile communications radio receiver of claim 1, wherein the RF unit further comprises:
    a first RF down-converter configured to generate the first down-converted signal, and
    a second RF down-converter configured to generate the second down-converted signal.

5. The mobile communications radio receiver of claim 1, wherein the mobile communications radio receiver is a WCDMA receiver.

6. The mobile communications radio receiver of claim 1, wherein a first paging indicator mapped to the paging indicator channel of the first radio network and a second paging indicator mapped to the paging indicator channel of the second radio network overlap in time.

7. The mobile communications radio receiver of claim 1, wherein the priority setting is automatically adjusted by the control unit based at least in part on network operator settings associated with at least the first radio network or the second radio network.

8. The mobile communications radio receiver of claim 1, wherein the priority setting is automatically adjusted by the control unit based at least in part on network paging indicator repetition information associated with at least the first radio network or the second radio network.

9. A method of demodulating pagings of multiple radio networks in a mobile communications radio receiver, comprising:
    generating a first down-converted signal from a radio signal received from a first radio network;
    generating a second down-converted signal from a radio signal received from a second radio network; and
    demodulating during a first period of time a paging indicator channel of the first radio network based on the first down-converted signal and demodulating during a second period of time a paging indicator channel of the second radio network based on the second down-converted signal by using the same paging indicator channel demodulator,
    wherein the first period of time and the second period of time correspond to two consecutive sets of one or more paging intervals of the first paging indicator channel, and
    switching the same paging indicator channel demodulator between the first and second radio network based on a priority setting,
    wherein the priority setting is adjustable via the mobile communications radio receiver, and
    wherein the priority setting defines a ratio between the first period of time and the second period of time.

10. The method of claim 9, wherein the first down-converted signal is generated from the radio signal received from the first radio network by using a first down-conversion frequency, the second down-converted signal is generated from the radio signal received from the second radio network by using a second down-conversion frequency, and the first and second down-conversion frequencies are different.

11. The method of claim 9, wherein the paging indicator channel of the first radio network and the paging indicator channel of the second radio network are demodulated alternatingly during consecutive periods of time, wherein each period of time corresponds to a paging interval of the first paging indicator channel.

12. The method of claim 9, wherein a first paging indicator mapped to the paging indicator channel of the first radio network and a second paging indicator mapped to the paging indicator channel of the second radio network overlap in time.

13. The method of claim 9, wherein the priority setting is automatically adjusted by the control unit based at least in part on a first channel quality of the radio signal received from the first radio network and on a second channel quality of the radio signal received from the second radio network.

14. The method of claim 9, wherein the priority setting is automatically adjusted by the control unit based at least in part on network paging indicator repetition information associated with at least the first radio network or the second radio network.

15. A mobile communications receiver for multiple radio network operation, comprising:
- an RF unit configured to generate a first down-converted signal from a radio signal received from a first radio network and a second down-converted signal from a radio signal received from a second radio network;
- a paging indicator channel demodulator configured to demodulate during a first period of time a paging indicator channel of the first radio network based on the first down-converted signal and demodulate during a second period of time a paging indicator channel of the second radio network based on the second down-converted signal,
- wherein the first period of time is different from the second period of time, and
- a control unit configured to switch the paging indicator channel demodulator between the first and second radio network based on a priority setting,
- wherein the priority setting comprises a ratio between the first period of time and the second period of time, and wherein the ratio is based at least in part on a first channel quality of the first radio network and on a second channel quality of the second radio network.

16. The mobile communications receiver of claim 15, wherein the first period of time and the second period of time do not overlap.

17. The mobile communications receiver of claim 15, wherein the ratio determines a first number of paging intervals of the first radio network corresponding to the first period of time and a second number of paging intervals of the first radio network corresponding to the second period of time.

18. A mobile communications receiver for multiple radio network operation, comprising:
- an RF unit configured to generate a first down-converted signal from a radio signal received from a first radio network and a second down-converted signal from a radio signal received from a second radio network;
- a paging indicator channel demodulator configured to demodulate during a first period of time a paging indicator channel of the first radio network based on the first down-converted signal and demodulate during a second period of time a paging indicator channel of the second radio network based on the second down-converted signal,
- wherein the first period of time is different from the second period of time, and
- a control unit configured to switch the paging indicator channel demodulator between the first and second radio network based on a priority setting,
- wherein the priority setting is based on a network information about a number of repetitions of the paging indicator, and
- wherein the priority setting is automatically adjusted by the control unit based at least in part on a first channel quality of the radio signal received from the first radio network and on a second channel quality of the radio signal received from the second radio network.

* * * * *